United States Patent
Liu et al.

(10) Patent No.: US 12,258,082 B2
(45) Date of Patent: Mar. 25, 2025

(54) LEG ASSEMBLY FOR LEGGED ROBOT AND LEGGED ROBOT

(71) Applicant: Beijing Xiaomi Robot Technology Co., Ltd., Beijing (CN)

(72) Inventors: Yiyang Liu, Beijing (CN); Wenping Guo, Beijing (CN); Xiaomao Wei, Beijing (CN); Fang Zhi, Beijing (CN); Shuang Li, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 658 days.

(21) Appl. No.: 17/565,825

(22) Filed: Dec. 30, 2021

(65) Prior Publication Data

US 2022/0297776 A1 Sep. 22, 2022

(30) Foreign Application Priority Data

Mar. 17, 2021 (CN) .......................... 202120553343.6

(51) Int. Cl.
| | | |
|---|---|---|
| *B62D 57/02* | (2006.01) | |
| *B25J 9/12* | (2006.01) | |
| *B60K 1/02* | (2006.01) | |
| *B60K 17/04* | (2006.01) | |

(52) U.S. Cl.
CPC .............. *B62D 57/02* (2013.01); *B25J 9/126* (2013.01); *B60K 1/02* (2013.01); *B60K 17/04* (2013.01)

(58) Field of Classification Search
CPC ..................................................... B62D 57/02
See application file for complete search history.

(56) References Cited

U.S. PATENT DOCUMENTS

| | | | | |
|---|---|---|---|---|
| 10,940,582 B2 * | 3/2021 | Wang | ....................... | B25J 9/108 |
| 11,890,756 B2 * | 2/2024 | Liu | ........................ | B25J 9/101 |
| 11,938,621 B2 * | 3/2024 | Wang | ....................... | B25J 9/126 |
| 2022/0143846 A1 * | 5/2022 | Wang | ....................... | B25J 9/102 |

(Continued)

FOREIGN PATENT DOCUMENTS

| | | | | |
|---|---|---|---|---|
| CN | 106476928 A | | 3/2017 | |
| CN | 206107391 U | | 4/2017 | |
| CN | 107128394 A | * | 9/2017 | ........... B62D 57/032 |

(Continued)

OTHER PUBLICATIONS

European Patent Application No. 21217883.4, Search and Opinion dated Jun. 23, 2022, 7 pages.

*Primary Examiner* — Kevin Hurley
*Assistant Examiner* — Hosam Shabara
(74) *Attorney, Agent, or Firm* — Cozen O'Connor (57) ABSTRACT

A leg assembly for a legged robot includes first through three motors, first through second legs, and a transmission component. The first motor is coupled to the second motor to drive the second motor to rotate, and a rotation axis of the first motor is substantially orthogonal to a rotation axis of the second motor. The second motor is coupled to the third motor to drive the third motor to rotate, and a rotation axis of the third motor substantially coincides with the rotation axis of the second motor. The third motor is arranged at a first end of the first leg, the second leg is pivotably coupled to a second end of the first leg, and the transmission component is coupled to an output shaft of the third motor and the second leg to drive the second leg to rotate relative to the first leg.

19 Claims, 8 Drawing Sheets

(56) References Cited

U.S. PATENT DOCUMENTS

2023/0286602 A1* 9/2023 Wang .................. B25J 9/102

FOREIGN PATENT DOCUMENTS

| CN | 110884588 | A |   | 3/2020  |        |           |
|----|-----------|---|---|---------|--------|-----------|
| CN | 112141238 | A |   | 12/2020 |        |           |
| CN | 112498517 | A | * | 3/2021  | ...... | B62D 57/032 |
| CN | 112623064 | A | * | 4/2021  | ...... | B62D 57/032 |

* cited by examiner

LEG ASSEMBLY FOR LEGGED ROBOT AND LEGGED ROBOT

CROSS-REFERENCE TO RELATED APPLICATION

This application is based on and claims priority to the Chinese Patent Application No. 202120553343.6 filed on Mar. 17, 2021, the entire contents of which are incorporated herein by reference.

TECHNICAL FIELD

The present disclosure relates to the field of robot technologies, and more particularly, to a leg assembly for a legged robot and a legged robot.

BACKGROUND

Legged robots, also known as robots having legs, generally include a body assembly and a leg assembly. The leg assembly includes a thigh pivotably coupled to the body assembly and a shank pivotably coupled to the thigh. In the related art, a joint of the leg assembly of legged robots has narrow movement range and low degree of freedom, resulting in that the legged robot cannot complete more complex actions. Therefore, the legged robots cannot meet use needs of users and have poor adaptability.

SUMMARY

A leg assembly for a legged robot according to the embodiments of the present disclosure includes: a first motor, a second motor and a third motor, the first motor being coupled to the second motor to drive the second motor to rotate relative to the first motor, a rotation axis of the first motor being substantially orthogonal to a rotation axis of the second motor, the second motor being coupled to the third motor to drive the third motor to rotate relative to the second motor, a rotation axis of the third motor substantially coinciding with the rotation axis of the second motor; and a first leg, a second leg and a transmission component, the third motor being arranged at a first end of the first leg, the second leg is pivotably coupled to a second end of the first leg, the transmission component being coupled to an output shaft of the third motor and the second leg to drive the second leg to rotate relative to the first leg.

A legged robot according to the embodiments of the present disclosure includes a body assembly and a plurality of leg assemblies. Each leg assembly includes: a first motor, a second motor and a third motor, the first motor being coupled to the second motor to drive the second motor to rotate relative to the first motor, a rotation axis of the first motor being substantially orthogonal to a rotation axis of the second motor, the second motor being coupled to the third motor to drive the third motor to rotate relative to the second motor, a rotation axis of the third motor substantially coinciding with the rotation axis of the second motor; and a first leg, a second leg and a transmission component, the third motor being arranged at a first end of the first leg, the second leg is pivotably coupled to a second end of the first leg, the transmission component being coupled to an output shaft of the third motor and the second leg to drive the second leg to rotate relative to the first leg. The first motor of the leg assembly is coupled to the body assembly.

DETAILED DESCRIPTION

Embodiments of the present disclosure are described in detail below, and examples of the embodiments are illustrated in accompanying drawings. The following embodiments described with reference to the accompanying drawings are exemplary and are intended to explain the present disclosure rather than limit the present disclosure.

A leg assembly for a legged robot and a legged robot having the leg assembly according to an embodiment of the present disclosure are described below with reference to the accompanying drawings.

Figure 1:
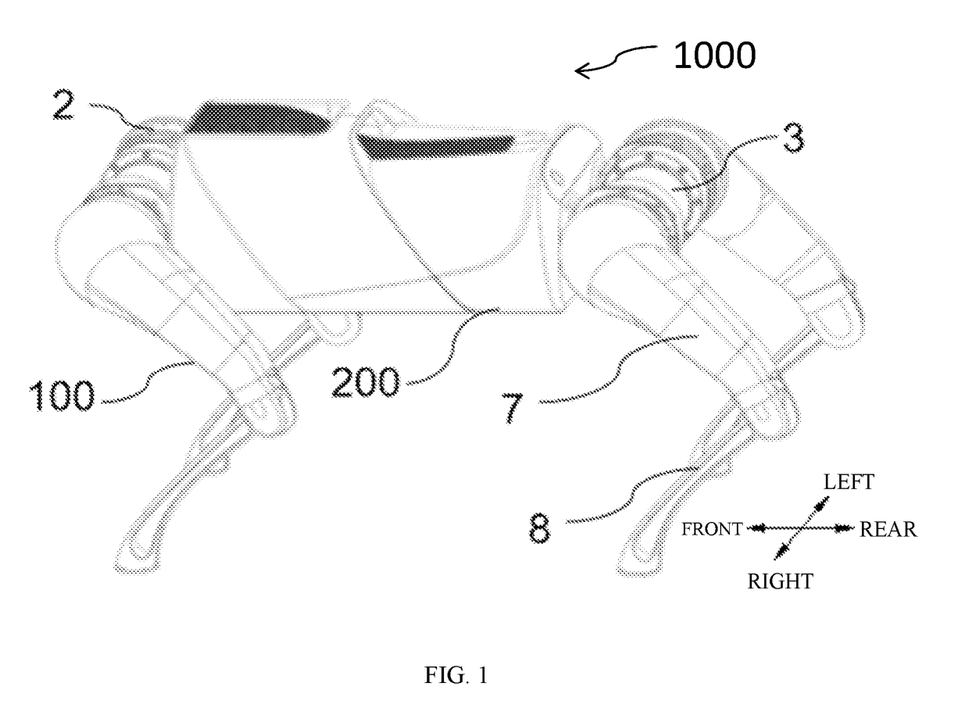
FIG. 1 is a schematic view of a legged robot according to an embodiment of the present disclosure.

First, the legged robot according to the embodiments of the present disclosure is briefly described. As illustrated in FIG. 1, the legged robot according to the embodiments of the present disclosure includes a body assembly 200 and a plurality of leg assemblies 100. In the embodiment illustrated in FIG. 1, four leg assemblies 100 are provided, and thus the robot can be called as a quadruped robot or a four-legged robot. It can be understood that the present disclosure is not limited to this. For example, the legged robot can also include two leg assemblies 100, and accordingly, the robot can be called as a biped robot or a two-legged robot. In the embodiment illustrated in FIG. 1, the four leg assemblies 100 are coupled to the body assembly 200 to support the body assembly 200. Actions such as walking of the robot can be realized when the leg assemblies 100 operate.

The leg assembly for the legged robot according to the embodiments of the present disclosure is described in detail below with reference to FIGS. 1 to 9.

Figure 6:
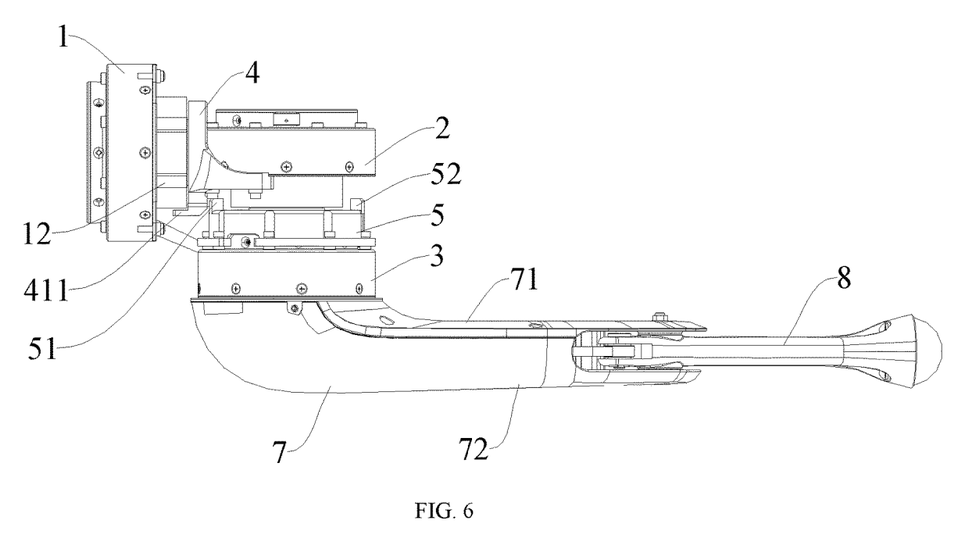
FIG. 6 is a schematic view of a leg assembly according to an embodiment of the present disclosure.
Figure 7:
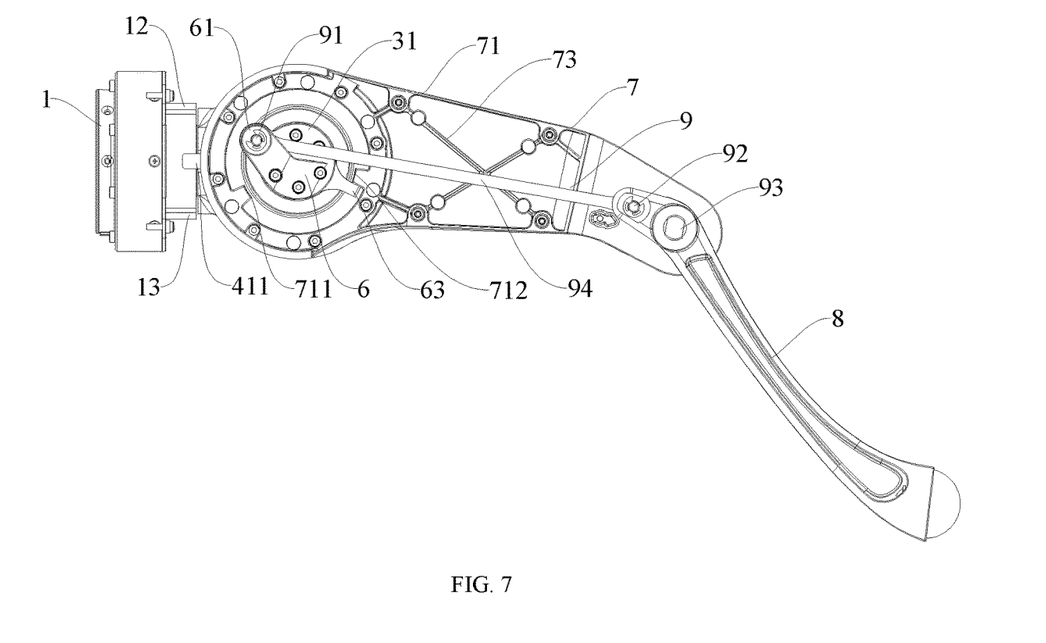
FIG. 7 is a schematic view of a leg assembly with an outer housing removed according to an embodiment of the present disclosure.

As illustrated in FIGS. 1, 6 and 7, the leg assembly 100 for the legged robot according to the embodiments of the present disclosure includes: a first motor 1, a second motor 2, a third motor 3, a first leg 7, a second leg 8 and a transmission component 9.

Figure 8:
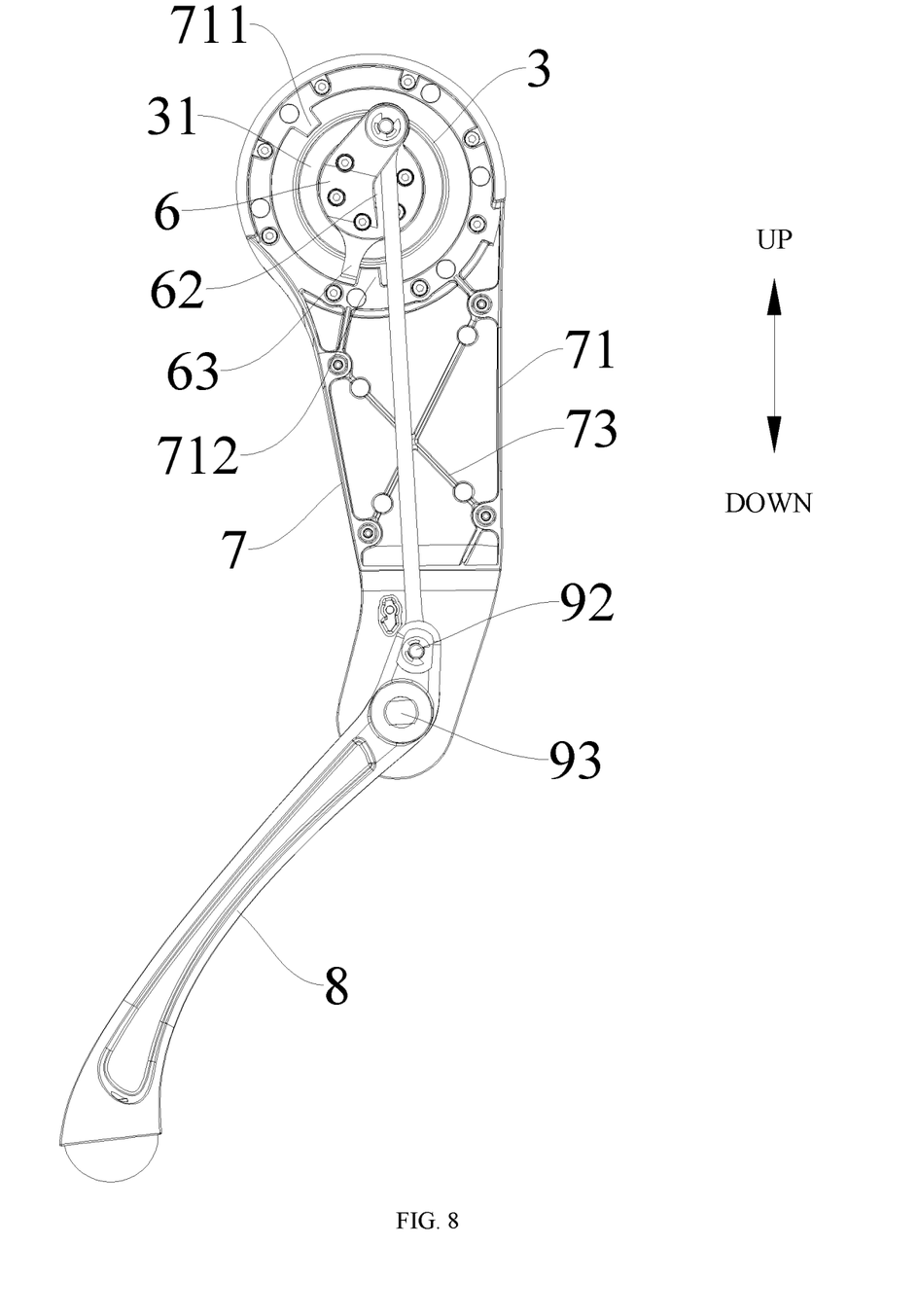
FIG. 8 is a partial schematic view of a leg assembly according to an embodiment of the present disclosure.

The first motor 1 is mounted on the body assembly 200 of the legged robot. The first motor 1 is coupled to the second motor 2 to drive the second motor 2 to rotate relative to the first motor 1, and a rotation axis of the first motor 1 is substantially orthogonal to a rotation axis of the second motor 2. The second motor 2 is coupled to the third motor 3 to drive the third motor 3 to rotate relative to the second motor 2, and a rotation axis of the third motor 3 substantially coincides with a rotation axis of the second motor 2. The third motor 3 is arranged at a first end of the first leg 7 (an upper end of the first leg 7 as illustrated in FIG. 8), the second leg 8 is pivotably coupled to a second end of the first leg 7 (a lower end of the first leg 7 as illustrated in FIG. 8), and the transmission component 9 is coupled to an output shaft 31 of the third motor and the second leg 8, to drive the second leg 8 to rotate relative to the first leg 7.

It can be understood that, as illustrated in FIG. 1, the rotation axis of the first motor 1 is parallel to a front-rear direction of the body assembly 200, and the rotation axis of the second motor 2 is parallel to a left-right direction of the body assembly 200, so that the first motor 1 can drive the second motor 2 and associated first leg 7 and second leg 8 to swing circumferentially around the front-rear direction of the body assembly 200. Furthermore, the leg assembly 100 according to the embodiments of the present disclosure can complete actions of a "extension" and a "retraction", to increase the movement range of the first leg 7 and the second leg 8 within a space, improve the flexibility of the legged robot during motion, enable the legged robot to complete more complex actions, and improve the applicability of the legged robot.

As illustrated in FIG. 6, the second motor 2 can drive the first leg 7 to rotate relative to the body assembly 200, and the third motor 3 can drive the second leg 8 to rotate around the second end of the first leg 7 through the transmission component 9. Therefore, the leg assembly 100 according to the embodiments of the present disclosure can realize a walking action of the first leg 7 and the second leg 8 through the rotation of the first motor 1 and the second motor 2.

Figure 2:
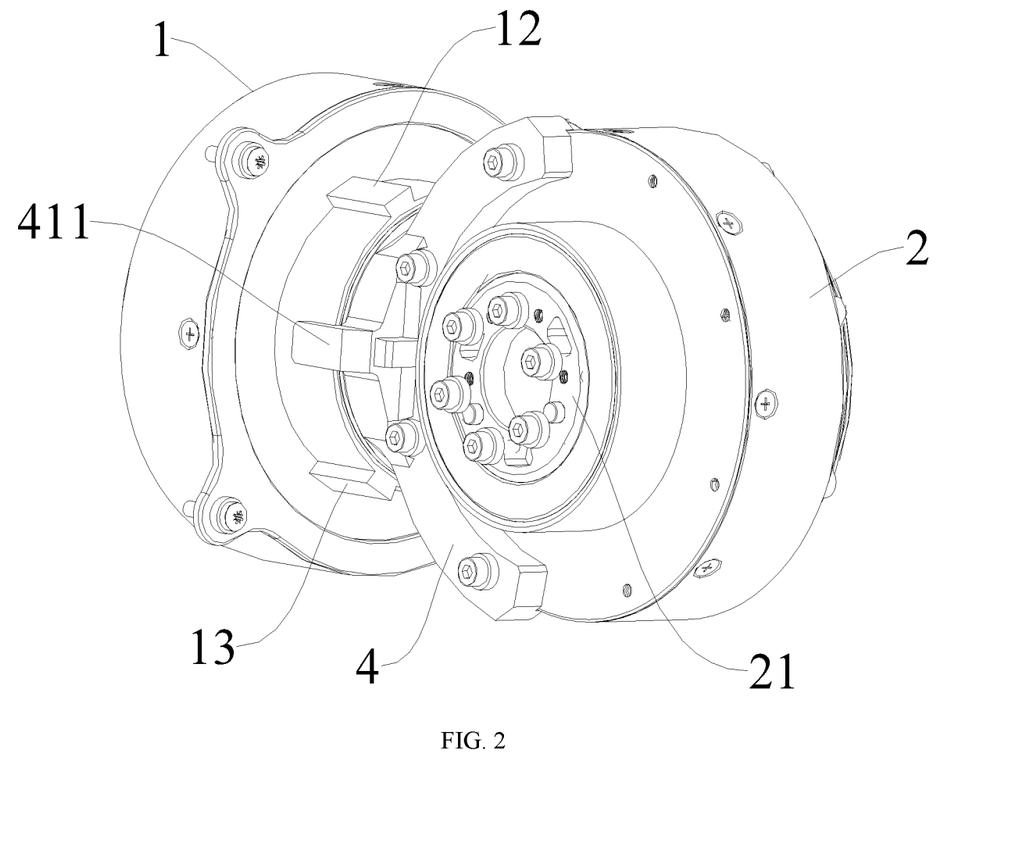
FIG. 2 is an assembly view of a first motor and a second motor of a leg assembly according to an embodiment of the present disclosure.
Figure 3:
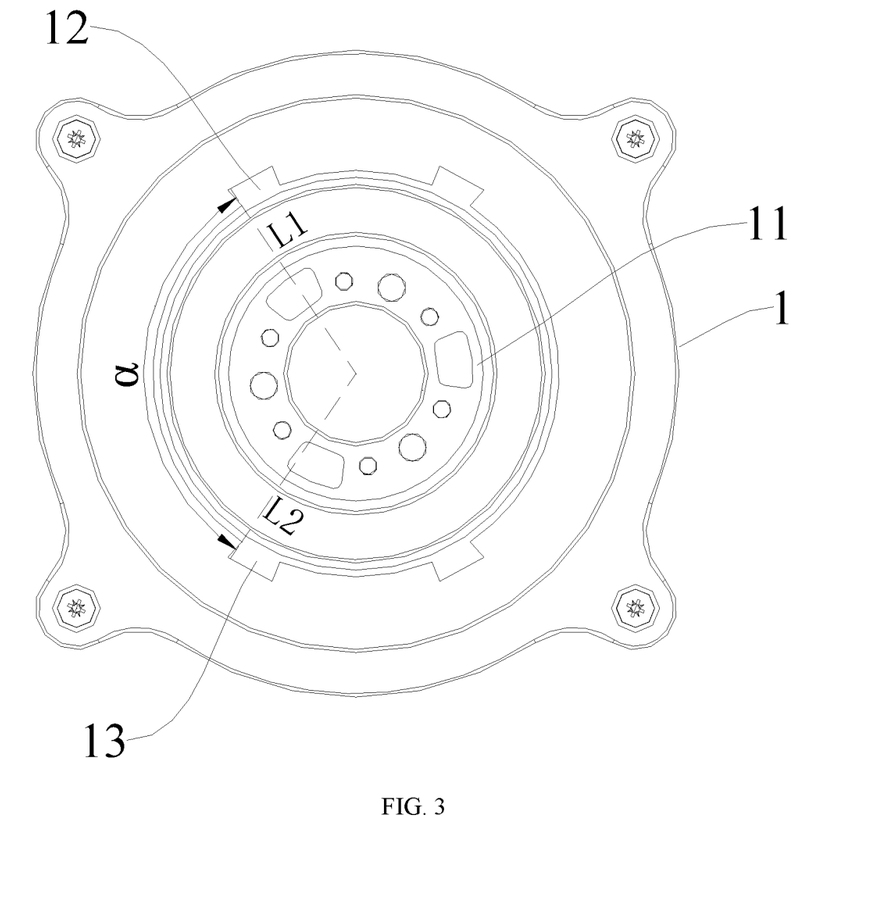
FIG. 3 is a schematic view of a first motor of a leg assembly according to an embodiment of the present disclosure.
Figure 4:
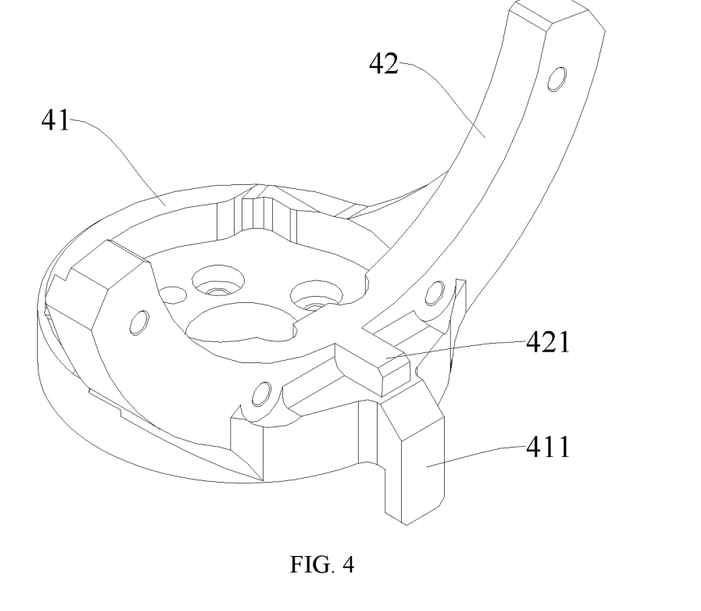
FIG. 4 is a schematic view of a first flange of a leg assembly according to an embodiment of the present disclosure.

In an embodiment, as illustrated in FIGS. 2 to 4, the leg assembly 100 further includes a first flange 4, and the first flange 4 is coupled to the second motor 2 and located between the first motor 1 and the second motor 2. The first flange 4 is provided with a first limit portion 411, the first motor 1 is provided with a first stop portion 12 and a second stop portion 13, and the first stop portion 12 and the second stop portion 13 are spaced apart, to limit a rotation angle of the second motor 2 by stopping the first limit portion 411. In other words, the first stop portion 12 and the second stop portion 13 respectively define rotation limit positions of the first limit portion 411. When the first limit portion 411 is stopped by the first stop portion 12 or the second stop portion 13, a further rotation of the first flange 4, i.e., a further rotation of the first motor 1 is prevented.

In the leg assembly 100 for the legged robot according to the embodiments of the present disclosure, since the first motor 1 is provided with the first stop portion 12 and the second stop portion 13, a range of the rotation angle of the first flange 4 can be conveniently limited, to conveniently control a rotation amplitude of an "extension" action and a "retraction" action of the first leg 7 and the second leg 8. Furthermore, it is more conducive to the accurate control of the leg assembly 100, and the limit reliability of the leg assembly 100 during motion is improved.

In some embodiments, as illustrated in FIG. 3, an angle α between a first coupling line L1 of the first stop portion 12 and a rotation center of the first motor 1 and a second coupling line L2 of the second stop 13 and the rotation center of the first motor 1 satisfies: 110 degrees≤α≤130 degrees. It is found through experiments that a force and an impact applied to the leg assembly 100 are small, and the legged robot is relatively stable when walking, when the angle α between the first coupling line L1 and the second coupling line L2 is 110 degrees or 130 degrees.

In at least one embodiment, it is found through experiments that the force and impact applied to the leg assembly 100 are less, and the legged robot is more stable when walking, when the angle α between the first coupling line L1 and the second coupling line L2 is 120 degrees. Moreover, the angle set as above can make full use of their degrees of freedom, avoid interference, widen the movement range of the leg assembly 100, and improve the motion stability of the legged robot.

Further, as illustrated in FIG. 4, the first flange 4 is provided with a second limit portion 421, and the leg assembly 100 further includes a second flange 5. The second flange 5 is coupled to the third motor and is pivotable relative to an output shaft 21 of the second motor, and the second flange 5 is located between the second motor 2 and the third motor 3. The second flange 5 is provided with a third stop portion 51 and a fourth stop portion 52, and the third stop portion 51 and the fourth stop portion 52 are spaced apart, to limit a rotation angle of the third motor 3 by stopping the second limit portion 421.

Figure 5:
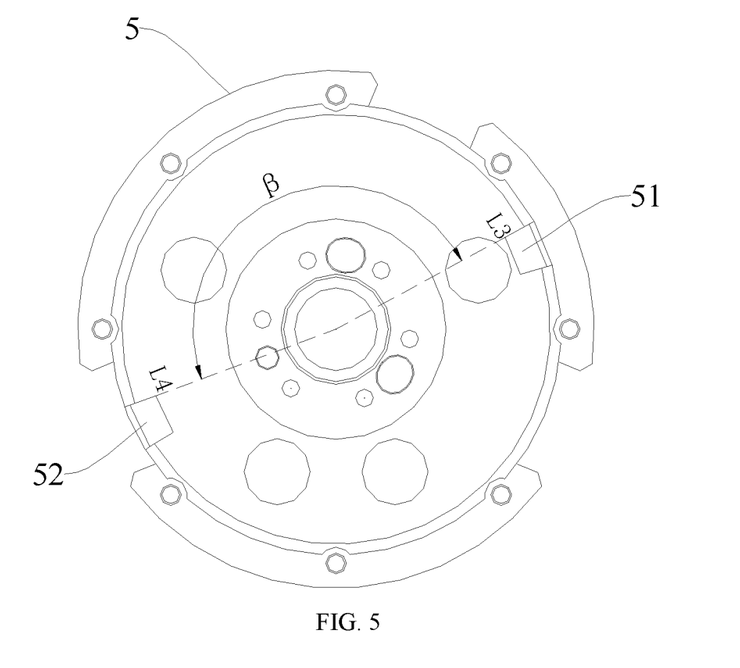
FIG. 5 is a schematic view of a second flange of a leg assembly according to an embodiment of the present disclosure.

It can be understood that, as illustrated in FIGS. 2, 4 and 5, the third stop portion 51 and the fourth stop portion 52 respectively define rotation limit positions of the second limit portion 421. When the second limit portion 421 is stopped by the third stop portion 51 or the fourth stop portion 52, a further rotation of the second flange 5 can be prevented. Therefore, in the leg assembly 100 for a legged robot according to the embodiments of the present disclosure, since the second flange 5 is provided with the third stop portion 51 and the fourth stop portion 52, a range of a rotation angle of the second flange 5 can be conveniently limited, to conveniently control a swing amplitude of the first leg 7. Furthermore it is more conducive to the accurate control of the leg assembly 100 and the limit reliability of the leg assembly 100 during motion is improved.

In some embodiments, as illustrated in FIG. 5, an angle β between a third coupling line L3 of the third stop portion 51 and a rotation center of the second motor 2, and a fourth coupling line L4 of the fourth stop portion 52 and the rotation center of the second motor 2, satisfies: 170 degrees≤β≤180 degrees. The inventors of the present disclosure found through experiments that the force and impact applied to the leg assembly 100 are small, and the legged robot is relatively stable when walking, when the angle β between the third coupling line L3 and the fourth coupling line L4 is 170 degrees or 180 degrees.

In at least one embodiment, it is found through experiments that the force and impact applied to the leg assembly 100 are less, and the legged robot is more stable when walking, when the angle β between the third coupling line L3 and the fourth coupling line L4 is 175 degrees. Moreover, the angle β set as above can make full use of their degrees of freedom, avoid the interference, widen the movement range of the leg assembly 100, and improve the motion stability of the legged robot.

Further, as illustrated in FIG. 4, the second limit portion 421 is substantially located on a coupling line between the first limit portion 411 and the rotation center of the first flange 4. In other words, a coupling line between the second limit portion 421 and the center of the first flange 4 coincides with a coupling line between the first limit portion 411 and the center of the first flange 4. Therefore, when machining the first flange 4, the first limit portion 411 and the second limit portion 421 can be processed and formed more conveniently, thereby shortening the processing and manufacturing time of the first flange 4. In addition, since the first limit portion 411 and the second limit portion 421 are substantially located at the same position, it is convenient for an operator to design and plan a motion trajectory when the leg assembly 100 rotates, to improve the controllability of the leg assembly 100 during motion.

In an embodiment, as illustrated in FIG. 4, the first flange 4 includes a first coupling portion 41 and a second coupling portion 42. The first coupling portion 41 is detachably coupled to the output shaft 11 of the first motor through a threaded member. The first coupling portion 41 is integrally formed with the second coupling portion 42. The second coupling portion 42 is detachably coupled to a casing of the second motor 2 through the threaded member. The first limit portion 411 is located on the first coupling portion 41, and the second limit portion 421 is located on the second coupling portion 42. For example, the first coupling portion 41 is a disc-shaped member, and is detachably coupled to an end of the output shaft 11 of the first motor through the threaded member; the second coupling portion 42 is a ring-shaped member, and surrounds the casing of the second motor 2; so that the coupling strength of the first flange 4 with the first motor 1 and the second motor 2 can be improved, and it is convenient for the assembly and the disassembly by the operator.

Figure 9:
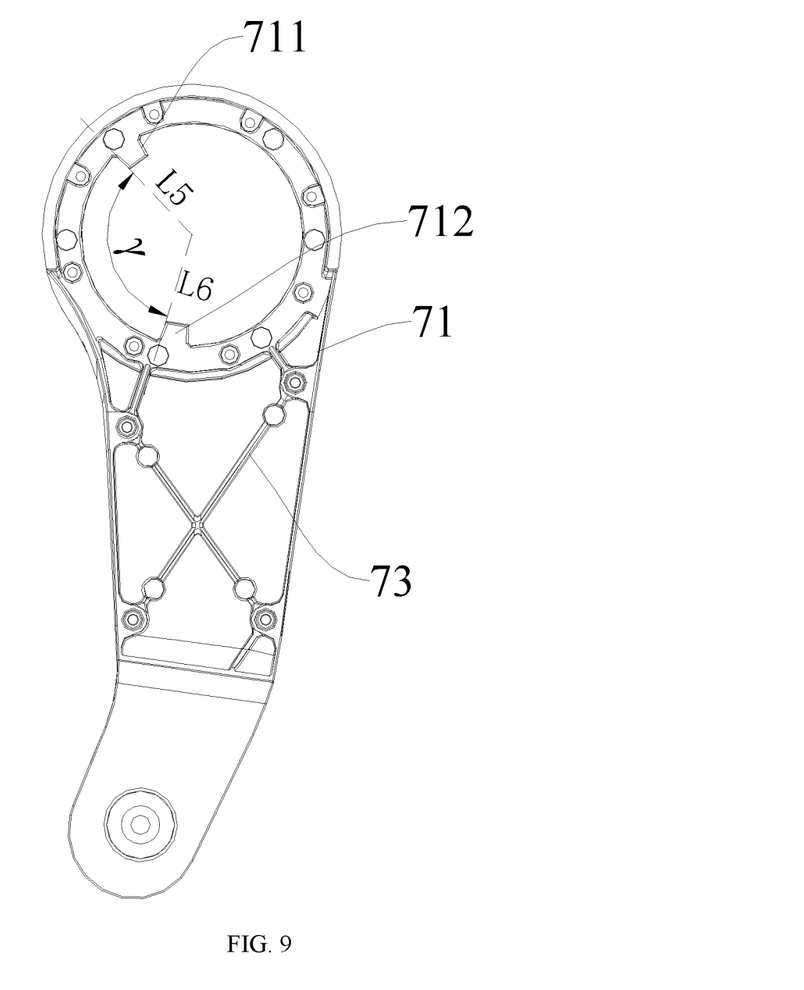
FIG. 9 is a schematic view of an inner housing of a leg assembly according to an embodiment of the present disclosure.

In some embodiments, as illustrated in FIGS. 7 to 9, the leg assembly 100 further includes a third flange 6, and an output shaft 31 of the third motor is coupled to the third flange 6, to drive the third flange 6 to rotate. The third flange 6 is provided with a third limit portion 63, the first leg 7 is provided with a fifth stop portion 711 and a sixth stop portion 712, and the fifth stop portion 711 and the sixth stop portion 712 are spaced apart, to limit a rotation angle of the third motor 3 by stopping the third limit portion 63. In other words, the fifth stop portion 711 and the sixth stop portion 712 respectively define rotation limit positions of the third limit portion 63. When the third limit portion 63 is stopped by the fifth stop portion 711 or the sixth stop portion 712, a further rotation of the third flange 6, i.e., a further rotation of the third motor 3, can be prevented.

In the leg assembly 100 for the legged robot according to the embodiments of the present disclosure, since the first leg 7 is provided with the fifth stop portion 711 and the sixth stop portion 712, a range of a rotation angle of the third flange 6 can be conveniently limited, to conveniently control a swing amplitude of the second leg 8. Furthermore, it is more conducive to the accurate control of the leg assembly 100 and the limit reliability of the leg assembly 100 during motion is improved.

As illustrated in FIG. 9, an angle γ between a fifth coupling line L5 of the fifth stop portion 711 and a rotation center of the third motor 3 and a sixth coupling line L6 of the sixth stop portion 712 and the rotation center of the third motor 3 satisfies: 120 degrees≤γ≤140 degrees. It is found through experiments that, the force and impact applied to the leg assembly 100 are small, and the legged robot is relatively stable when walking, when the angle γ between the fifth coupling line L5 and the sixth coupling line L6 is 120 degrees or 140 degrees.

In at least one embodiment, it is found through experiments that the force and impact applied to the leg assembly 100 are less, and the legged robot is more stable when walking, when the angle γ between the fifth coupling line L5 and the sixth coupling line L6 is 130 degrees. Moreover, the angle γ set as above can make full use of their degrees of freedom, avoid the interference, widen the movement range of the leg assembly 100, and improve the motion stability of the legged robot.

In some embodiments, as illustrated in FIGS. 7 and 8, the transmission component 9 includes a coupling rod 94, a first end (an upper end of the coupling rod 94 as illustrated in FIG. 8) of the coupling rod 94 is pivotably coupled to the third flange 6 through a first pivot shaft 91, and a second end of the coupling rod 94 is pivotably coupled to a first end (an upper end of the second leg 8 as illustrated in FIG. 8) of the second leg 8 through a second pivot shaft 92. The second end (the lower end of the first leg 7 illustrated in FIG. 8) of the first leg 7 is pivotably coupled to the first end of the second leg 8 through a third pivot shaft 93.

In an embodiment, in FIGS. 7 and 8, the third pivot shaft 93 is located between the second pivot shaft 92 and a second end of the first leg 7, that is, the third pivot shaft 93 is closer to the second end (a lower end illustrated in FIG. 8) of the first leg 7 than the second pivot shaft 92. When the third flange 6 rotates clockwise, the coupling rod 94 moves downward and drives the second pivot shaft 92 to move downward, to drive the second leg 8 to swing clockwise around the third pivot shaft 93, that is, the second leg 82 is retracted relative to the first leg 71. On the contrary, when the third flange 6 rotates counterclockwise, the coupling rod 94 moves upward and drives the second pivot shaft 92 to move upward, to drive the second leg 8 to swing counter-clockwise around the third pivot shaft 93, that is, the second leg 8 is extended relative to the first leg 7.

In some embodiments, as illustrated in FIGS. 7 and 8, the third flange 6 is provided with a recessed portion 62, an end of the recessed portion 62 is provided with a U-shaped fitting groove 61, the first end (the upper end of the coupling rod 94 illustrated in FIG. 8) of the coupling rod 94 is pivotably fitted in the U-shaped fitting groove 61, and a surface of the recessed portion 62 can stop the coupling rod 94 to limit rotation of the second leg 8. It can be understood that, as illustrated in FIG. 8, when the coupling rod 94 rotates, a side wall of the coupling rod 94 can abut against the surface of the recessed portion 62 to limit rotation of the coupling rod 94, and then limit the rotation of the third flange 6 and the second leg 8, so that the reliability of the limit is further improved, the force and impact applied to respective members are reduced, and then the movement of the second leg 8 can be controlled more accurately.

In some embodiments, as illustrated in FIGS. 7 to 9, the first leg 7 includes an inner housing 71 and an outer housing 72, and the third motor 3 is coupled to the inner housing 71. The inner housing 71 and the outer housing 72 are coupled with each other and define a receiving cavity, and the transmission component 9 is arranged inside the receiving cavity, so that the transmission component 9 can be prevented from being exposed to the outside for a long time, and then the transmission stability of the leg assembly 100 is improved.

In an embodiment, as illustrated in FIGS. 7 to 9, the inner housing 71 and the outer housing 72 are detachably coupled through the threaded member, a circumferential wall of the receiving cavity is provided with crossed reinforcing ribs 73, and the threaded member is located at a junction of the reinforcing ribs 73, to further improve the coupling strength between the inner housing 71 and the outer housing 72 and then further improve the service life of the leg assembly 100 for a legged robot according to the embodiments of the present disclosure.

In some embodiments, an outer circumferential wall of the outer housing 72 is coated with a buffer layer (not illustrated), for example, the buffer layer can be covered on an upper end of the outer housing 72, wherein the buffer layer can be a foam buffer layer or a rubber buffer layer, so that the legged robot can be buffered through the buffer layer when placed on the side or fallen down, thereby reducing the probability of the wear and the collision of the legged robot.

As illustrated in FIG. 1, the legged robot 1000 according to the embodiments of the present disclosure has four leg assemblies 100, and the first motors 1 of the four leg assemblies 100 are all coupled to the body assembly 200. It can be understood that, in the leg assembly 100, the swing amplitude of the extension and the retraction of the first leg 7 and the second leg 8 can be adjusted by the first motor 1, the second motor 2 controls the first leg 7 to rotate relative to the body assembly 200, and the third motor 3 drives the second leg 8 to rotate relative to the first leg 7, to realize actions such as the walking of the robot. The legged robot 1000 according to the embodiments of the present disclosure has a wide movement range, good practicability, a reliable limit, the force and impact applied to various components are small, the operation is stable and the control precision is high.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as illustrated in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "coupled," "connected," "fixed" and the like are used broadly, and may be, for example, fixed connections, detachable connections, or integral connections; may also be mechanical or electrical connections or intercommunication; may also be direct connections or indirect connections via intervening structures; may also be inner communications or interactions of two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been illustrated and described above, it can be understood that the above embodiments are exemplary and shall not be understood as limitation on the present disclosure, and changes, modifications, alternatives and variations can be made in the above embodiments by those skilled in the art within the scope of the present disclosure.

What is claimed is:

1. A leg assembly for a legged robot, comprising:
a first motor, a second motor and a third motor, the first motor being coupled to the second motor to drive the second motor to rotate relative to the first motor, a rotation axis of the first motor being substantially orthogonal to a rotation axis of the second motor, the second motor being coupled to the third motor to drive the third motor to rotate relative to the second motor, a rotation axis of the third motor substantially coinciding with the rotation axis of the second motor;
a first leg, a second leg and a transmission component, the third motor being arranged at a first end of the first leg, the second leg is pivotably coupled to a second end of the first leg, the transmission component being coupled to an output shaft of the third motor and the second leg to drive the second leg to rotate relative to the first leg; and
a first flange coupled to the second motor and located between the first motor and the second motor, the first flange being provided with a first limit portion, the first motor being provided with a first stop portion and a second stop portion, the first stop portion and the second stop portion being spaced apart to limit a rotation angle of the second motor by stopping the first limit portion.

2. The leg assembly according to claim 1, wherein an angle α between a first coupling line of the first stop portion and a rotation center of the first motor and a second coupling line of the second stop portion and the rotation center of the first motor satisfies: 110 degrees≤α≤130 degrees.

3. The leg assembly according to claim 2, wherein the angle α between the first coupling line and the second coupling line is 120 degrees.

4. The leg assembly according to claim 1, wherein the first flange is provided with a second limit portion, the leg assembly further comprises a second flange coupled to the third motor and located between the second motor and the third motor, the second flange is provided with a third stop portion and a fourth stop portion, and the third stop portion and the fourth stop portion are spaced apart to limit a rotation angle of the third motor by stopping the second limit portion.

5. The leg assembly according to claim 4, wherein an angle β between a third coupling line of the third stop portion and a rotation center of the second motor and a fourth coupling line of the fourth stop portion and the rotation center of the second motor satisfies: 170 degrees≤β≤180 degrees.

6. The leg assembly according to claim 5, wherein an angle β between the third coupling line and the fourth coupling line is 175 degrees.

7. The leg assembly according to claim 4, wherein the second limit portion is substantially located on a coupling line between the first limit portion and a rotation center of the first flange.

8. The leg assembly according to claim 4, wherein the first flange comprises a first coupling portion and a second coupling portion, the first coupling portion is coupled to an output shaft of the first motor and the second coupling portion, the second coupling portion is coupled to a casing of the second motor, the first limit portion is located on the first coupling portion, and the second limit portion is located on the second coupling portion.

9. The leg assembly according to claim 8, wherein the first coupling portion is a disc-shaped member, the first coupling portion is coupled to an end of the output shaft of the first motor, the second coupling portion is a ring-shaped member, and the second coupling portion surrounds the casing of the second motor.

10. The leg assembly according to claim 1, further comprising a third flange, the output shaft of the third motor is coupled to the third flange to drive the third flange to rotate, the third flange being provided with a third limit portion, the first leg being provided with a fifth stop portion and a sixth stop portion, and the fifth stop portion and the sixth stop portion being spaced apart to limit a rotation angle of the third motor by stopping the third limit portion.

11. The leg assembly according to claim 10, wherein an angle γ between a fifth coupling line of the fifth stop portion and a rotation center of the third motor and a sixth coupling line of the sixth stop portion and the rotation center of the third motor satisfies: 120 degrees≤γ≤140 degrees.

12. The leg assembly according to claim 11, wherein the angle γ between the fifth coupling line and the sixth coupling line is 130 degrees.

13. The leg assembly according to claim 10, wherein the transmission component comprises a coupling rod having a first end pivotably coupled to the third flange through a first pivot shaft and a second end pivotably coupled to a first end of the second leg through a second pivot shaft, and the second end of the first leg is pivotably coupled to the first end of the second leg through a third pivot shaft.

14. The leg assembly according to claim 13, wherein the third pivot shaft is located between the second pivot shaft and the second end of the first leg.

15. The leg assembly according to claim 13, wherein the third flange is provided with a recessed portion, an end of the recessed portion is provided with a U-shaped fitting groove, the first end of the coupling rod is pivotably fitted in the U-shaped fitting groove, and a surface of the recessed portion can stop the coupling rod to limit rotation of the second leg.

16. The leg assembly for a legged robot according to claim 1, wherein the first leg comprises an inner housing and an outer housing, the third motor is coupled to the inner housing, the inner housing and the outer housing are coupled with each other and define a receiving cavity, and the transmission component is arranged inside the receiving cavity.

17. The leg assembly according to claim 16, wherein the inner housing and the outer housing are detachably coupled through a threaded member, a circumferential wall of the receiving cavity is provided with crossed reinforcing ribs, and the threaded member is located at a junction of the reinforcing ribs.

18. The leg assembly for a legged robot according to claim 16, wherein an outer circumferential wall of the outer housing is coated with a buffer layer.

19. A legged robot, comprising:
a body assembly; and
a plurality of leg assemblies, each leg assembly comprising:
a first motor, a second motor and a third motor, the first motor being coupled to the second motor to drive the second motor to rotate relative to the first motor, a rotation axis of the first motor being substantially orthogonal to a rotation axis of the second motor, the second motor being coupled to the third motor to drive the third motor to rotate relative to the second motor, a rotation axis of the third motor substantially coinciding with the rotation axis of the second motor;
a first leg, a second leg and a transmission component, the third motor being arranged at a first end of the first leg, the second leg is pivotably coupled to a second end of the first leg, the transmission component being coupled to an output shaft of the third motor and the second leg to drive the second leg to rotate relative to the first leg; and
a first flange coupled to the second motor and located between the first motor and the second motor, the first flange being provided with a first limit portion, the first motor being provided with a first stop portion and a second stop portion, the first stop portion and the second stop portion being spaced apart to limit a rotation angle of the second motor by stopping the first limit portion,
wherein the first motor of the leg assembly is coupled to the body assembly.

* * * * *